(12) United States Patent
Tanaka et al.

(10) Patent No.: US 8,132,853 B2
(45) Date of Patent: Mar. 13, 2012

(54) CAB AND CONSTRUCTION MACHINE

(75) Inventors: Hiroaki Tanaka, Hirakata (JP); Akihide Namura, Neyagawa (JP); Takahiro Noguchi, Yawata (JP); Fumiaki Kawahara, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 12/670,946

(22) PCT Filed: Sep. 11, 2008

(86) PCT No.: PCT/JP2008/066468
§ 371 (c)(1),
(2), (4) Date: Jan. 27, 2010

(87) PCT Pub. No.: WO2009/041285
PCT Pub. Date: Apr. 2, 2009

(65) Prior Publication Data
US 2010/0187860 A1    Jul. 29, 2010

(30) Foreign Application Priority Data

Sep. 27, 2007   (JP) .................................. 2007-251386

(51) Int. Cl.
*B62D 33/06* (2006.01)
(52) U.S. Cl. ................................. 296/190.08
(58) Field of Classification Search ............. 296/190.08, 296/190.03
See application file for complete search history.

(56) References Cited

U.S. PATENT DOCUMENTS

| 3,490,190 A | * | 1/1970 | See ................................ 52/844 |
| 3,694,990 A | * | 10/1972 | Pamer ............................ 52/839 |
| 3,989,396 A | * | 11/1976 | Matsumoto et al. .......... 403/174 |
| 2002/0180245 A1 | | 12/2002 | Dogan et al. |
| 2005/0072106 A1 | * | 4/2005 | Hiragaki ...................... 52/720.1 |
| 2006/0017308 A1 | | 1/2006 | Kojima et al. |
| 2009/0273206 A1 | * | 11/2009 | Namura et al. .......... 296/190.03 |

FOREIGN PATENT DOCUMENTS

| EP | 1415757 A2 | * | 5/2004 |
| JP | 49118512 | * | 10/1974 |
| JP | 04044556 A | * | 2/1992 |
| JP | 04285232 A | * | 10/1992 |
| JP | 11093259 A | * | 4/1999 |
| JP | 2002146921 A | * | 5/2002 |
| JP | 2004150071 A | * | 5/2004 |
| JP | 2005-111557 A | | 4/2005 |
| JP | 2006-037360 A | | 2/2006 |
| JP | 2006-240568 A | | 9/2006 |
| JP | 2006-298237 A | | 11/2006 |
| JP | 2008-189050 A | | 8/2008 |

* cited by examiner

*Primary Examiner* — H Gutman
(74) *Attorney, Agent, or Firm* — Global IP Counselors

(57) ABSTRACT

A cab includes left and right rear pole members having internal spaces and prescribed shapes in cross-section. The right rear pole member includes a first hole portion that extends along the longitudinal direction of the right rear pole member and penetrates the right rear pole member in the left-and-right direction of the right rear pole member, and a first plate-shaped member inserted into and secured in the first hole portion.

7 Claims, 11 Drawing Sheets

Insertion Direction (a)          (b)

CAB AND CONSTRUCTION MACHINE

CROSS-REFERENCE TO RELATED APPLICATIONS

This national phase application claims priority to Japanese Patent Application No. 2007-251386, filed on Sep. 27, 2007. The entire disclosure of Japanese Patent Application No. 2007-251386 is hereby incorporated herein by reference.

TECHNICAL FIELD

The present invention relates to a cab and a construction machine that includes a reinforcement structure for a pole member that composes the cab installed on the construction machines such as hydraulic excavator.

BACKGROUND ART

In recent years, a cab structure is used that is composed of a hollow pipe member as a pole member of a cab installed on a construction machine.

In this type of cab structure installed on a construction machine, the pipe used as the pole member is required to have at least certain strength. However, if the thickness of pipe is increased to improve the strength, material cost and processing cost will increase. This results in high cost. For this reason, there is a need for a reinforcement structure for a pipe capable of solving problems in both strength and cost.

For example, Japanese Patent Laid-Open Publication TOKUKAI No. 2006-240568 discloses a structure that, in order to make up for a strength shortage of a pillar (pole member) that is composed of joined sheet metal members, has a plate member that is arranged inside the pillar from the top end to the bottom end of the pillar.

In addition, Japanese Patent Laid-Open Publication TOKUKAI No. 2005-111557 discloses a double-structured tube production method that includes a diameter reduction process for reducing the external peripheral length of an outer pipe after an inner pipe is inserted into the outer pipe whereby forming a double-structured tube to reinforce the pipes.

DISCLOSURE OF INVENTION

However, the aforementioned known reinforcement structures of pipes have the following problems.

That is, the reinforcement structures of pipes disclosed in the foregoing Patent Japanese Patent Laid-Open Publication TOKUKAI Nos. 2006-240568 and 2005-111557 uniformly extend in the longitudinal direction of the pipes. For this reason, for example, as for a pole member that is arranged in proximity to a revolving frame and composes a cab, if the pole member hits the revolving frame when an external force is applied to the cab, the pole member locally receives the external force. This may bend the pole member at the hit part.

It is an object of the present invention is to provide a cab and a construction machine capable of ensuring a sufficient strength in a part that is arranged in proximity to a revolving frame and may be bent.

A cab according to a first aspect of the present invention includes left and right rear pole members having internal spaces and prescribed shapes in cross-section. The right rear pole member has a first hole portion, and includes a first plate-shaped member. The first hole portion extends along the longitudinal direction of the right rear pole member. The first hole portion penetrates the right rear pole member in the left-and-right direction of the right rear pole member. The first plate-shaped member is inserted into and secured in the first hole portion.

In this configuration, the first hole portion is formed on the outer peripheral side to reach the interior of a pipe-shaped pole member, which can be arranged in proximity to a main beam portion as a part of a revolving frame that composes a construction machine such as a hydraulic excavator, for example. In addition to this, the first plate-shaped member is inserted into and secured in the first hole portion to compose a reinforcement structure.

Here, the aforementioned main beam portion of the revolving frame can include a portion such as a mount portion for a working unit that protrudes from the frame.

Accordingly, in case of a rollover accident of a construction machine, as for a pole member that composes the cab and is arranged in proximity to the main beam portion of the revolving frame, even if deformation or the like of the cab brings the pole member in partial contact with the main beam portion, the reinforcement structure can locally improve the strength of the pole member. As a result, the minimal additional structure for the pipe-shaped pole member can avoid the pole member from being bent at the contact part. Therefore, it is possible to reduce the weight of the cab and additionally to improve the stiffness of the cab.

In a cab according to a second aspect of the present invention, in the cab according to the first aspect of the present invention, the first plate-shaped member is preferably inserted into the first hole portion so that the first plate-shaped member extends in a substantially center portion of the right rear pole member in cross-section.

In this configuration, as for the plate-shaped member that is formed on the outer peripheral surface of the pipe-shaped pole member, the plate-shaped member passes the substantially center portion of the pipe shape in cross-section, and is inserted into and secured in the first hole portion.

Accordingly, it is possible to stably improve the strength of the pole member, as compared with a reinforcement structure that includes a plate-shaped member that passes the end part of a pipe in cross-section. As a result, it is possible to minimize deformation of the cab in case of a rollover accident of a construction machine or the like.

In a cab according to a third aspect of the present invention, in the cab according to the first or second aspect of the present invention, the pole member further preferably has a second hole portion that is formed in proximity to a substantially center portion in the longitudinal direction of the pole member, and the pole member includes a second plate-shaped member that is inserted into and secured in the second hole portion.

In this configuration, a reinforcement structure (the second hole portion and the second plate-shaped member) is additionally arranged near the substantially center portion in the longitudinal direction of the pole member.

Since the reinforcement structure is thus arranged near the center in longitudinal direction of the pole member that is expected to be most easily bent, this reinforcement structure cooperates with the aforementioned local reinforcement structure. As a result, it is possible to improve the strength of each of the pole members. Therefore, it is possible to improve the stiffness of the entire cab.

In a cab according to a fourth aspect of the present invention, in the cab according to the third aspect of the present invention, the first hole portion is preferably spaced apart from the second hole portion in the width direction of the pole member, and partially overlaps the second hole portion in the longitudinal direction of the pole member.

In this configuration, the two reinforcement structures arranged in the pole member are deviated in the width direction so that the first hole portion and the second hole portion partially overlap each other in the longitudinal direction. In other words, in the side view of the pole member, the first hole portion and the second hole portion are deviated in the width direction so that an end of the first hole portion and an end of the second hole portion overlap each other.

Accordingly, it is possible to avoid that a low strength part locally appears in a bridging part between the two reinforcement structures arranged in the longitudinal direction. As a result, it is possible to uniformly improve the strength in the longitudinal direction of the pole member.

In a cab according to a fifth aspect of the present invention, in the cab according to the third aspect of the present invention, an additional second hole portion is preferably provided that is arranged in parallel to and adjacent to the second hole portion in the width direction of the pole member. The first hole portion is preferably arranged between the two second hole portions in the width direction of the pole member.

In this configuration, the two reinforcement structures formed in the pole member include the two second hole portions that are arranged in parallel to each other near the substantially center portion in longitudinal direction of the pole member, and the first hole portion that is formed at a position that is interposed between the two second hole portions and is deviated from the two second hole portions in the longitudinal direction.

Accordingly, one plate-shaped member and two plate-shaped members (first plate-shaped member and second plate-shaped members) can be inserted into the first hole portion and the second hole portions, respectively. As a result, the three plate-shaped members (first and second plate-shaped members) can compose an effective reinforcement structure.

A construction machine according to a sixth aspect of the present invention includes a cab and a main beam portion. The cab is installed on a revolving frame, and includes a plurality of pole members having internal spaces and prescribed shapes in cross-section. The main beam portion is arranged on the revolving frame. One of the pole members that is arranged in proximity to the main beam portion has a first hole portion that is formed in a position near the main beam portion. The first hole portion extends along the longitudinal direction of the pole member and penetrates the pole member in the left-and-right direction of the pole member. The first plate-shaped member is inserted into and secured in the first hole portion.

Accordingly, as stated above, the minimal additional structure for the pipe-shaped pole member can avoid the pole member from being bent at the contact part. Therefore, it is possible to reduce the weight of the cab and additionally to improve the stiffness of the cab.

A construction machine according to a seventh aspect of the present invention includes a cab and a main beam portion. The cab is installed on a revolving frame, and includes a plurality of pole members having internal spaces and pre-scribed shapes in cross-section. The main beam portion is arranged on the revolving frame. One of the pole members that is arranged in proximity to the main beam portion has a first hole portion that is formed in a position near the main beam portion. The first hole portion extends along the longitudinal direction of the pole member and penetrates the pole member in the left-and-right direction of the pole member. The pole member includes a first plate-shaped member that is inserted into and secured in the first hole portion. The first hole portion and the first plate-shape member are arranged in a prescribed position that is spaced away from the main beam portion in the normal state and comes in contact with the main beam portion when the pole member is inclined by a load that is applied to the cab toward the main beam portion.

Accordingly, as stated above, the minimal additional structure for the pipe-shaped pole member can avoid the pole member from being bent at the contact part. Therefore, it is possible to reduce the weight of the cab and additionally to improve the stiffness of the cab.

BRIEF DESCRIPTION OF THE DRAWINGS

FIG. 13 is a detailed cross-sectional view showing the configuration near the reinforcement structures shown in FIG. 6 when the cab is deformed by a load applied to the cab in a rollover accident, or the like.

DESCRIPTION OF EMBODIMENTS

With reference to FIGS. 1 to 13, the following description will describe a hydraulic excavator (construction machine) 1 that includes a cab 10 according to an embodiment of the present invention.

Overall Configuration of Hydraulic Excavator 1

Figure 1:
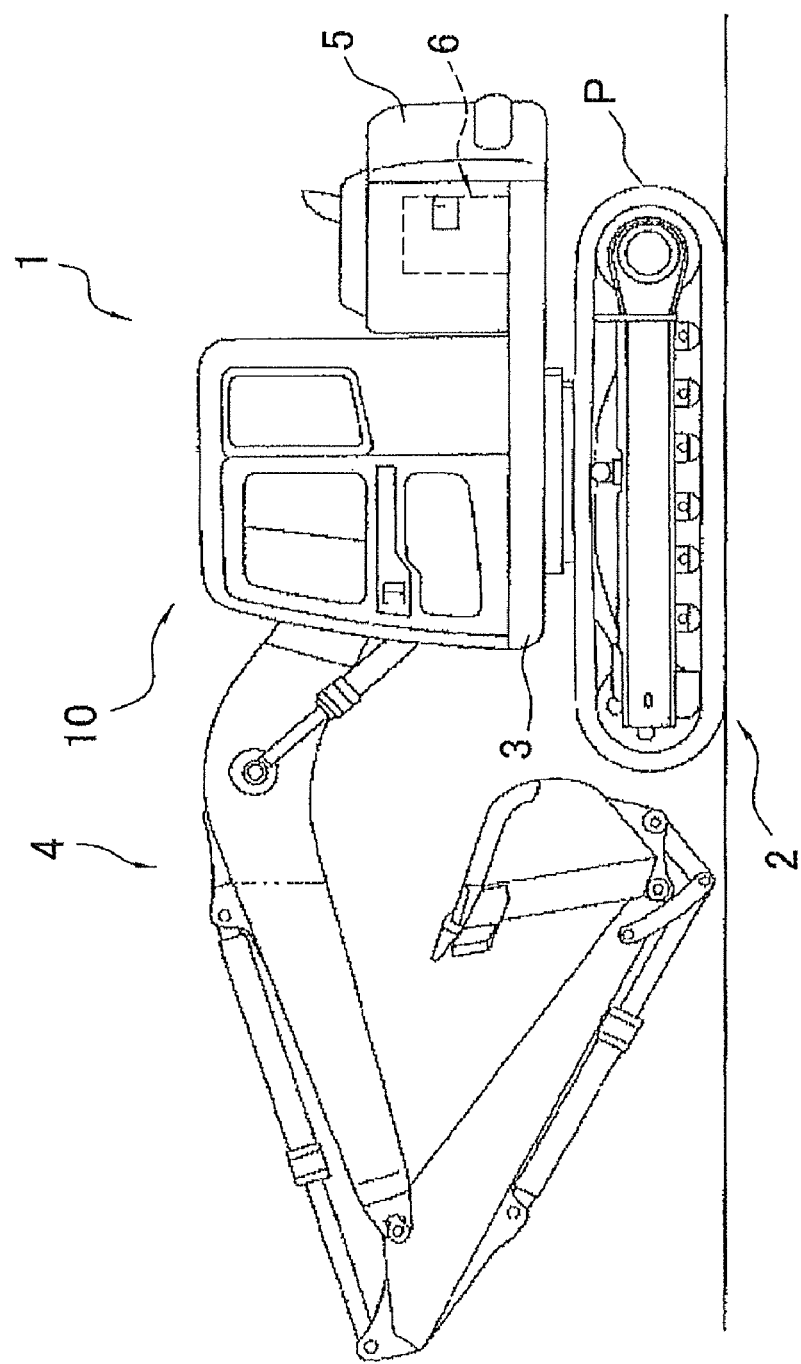
FIG. 1 is a side view showing a hydraulic excavator, which includes a cab according to an embodiment of the present invention.

The hydraulic excavator 1 according to this embodiment includes a lower tractor portion 2, a revolving frame 3, a working unit 4, a counterweight 5, an engine 6, and the cab 10, as shown in FIG. 1.

The lower tractor portion 2 drives crawler track belts P that are wounded on the left and right sides of the lower tractor portion 2 relative to the advance direction so that the hydraulic excavator 1 moves frontward and rearward. The revolving frame 3 is revolvably mounted on the upper side of the lower tractor portion 2.

The revolving frame 3 can revolve in either direction on the lower tractor portion 2. The working unit 4, the counterweight 5, the engine 6, and the cab 10 are mounted on the upper side of the revolving frame 3. The revolving frame 3 includes a main beam portion 3a in the substantially central part of the revolving frame 3. The working unit 4 is mounted to the main beam portion 3a. The main beam portion 3a is composed of a pair of plate-shaped frames that protrude upward. An arm portion of the working unit 4 is installed and swingably held between the plate-shaped frames. As for a peripheral part X (see FIG. 2) between the main beam portion 3a as a part of the revolving frame 3 and a pole member 34 that composes the cab 10, the arrangement of this peripheral part X will be described later.

The working unit 4 includes a boom, the arm that is mounted to the fore end of the boom, and a bucket that is mounted to the fore end of the arm. The working unit 4 moves the arm, the bucket, and the like upward and downward by means of hydraulic pressure cylinders to excavate earth, stones and the like in the field of civil engineering works.

The counterweight 5 is composed of scrap iron, concrete and the like that are fixed in a box that is composed of steel plates, for example, and is arranged on the rear side of the revolving frame 3 to keep the balance of a machine body in an excavation work or the like.

The engine 6 is a power source that powers the lower tractor portion 2 and the working unit 4, and is arranged near the counterweight 5.

Figure 2:
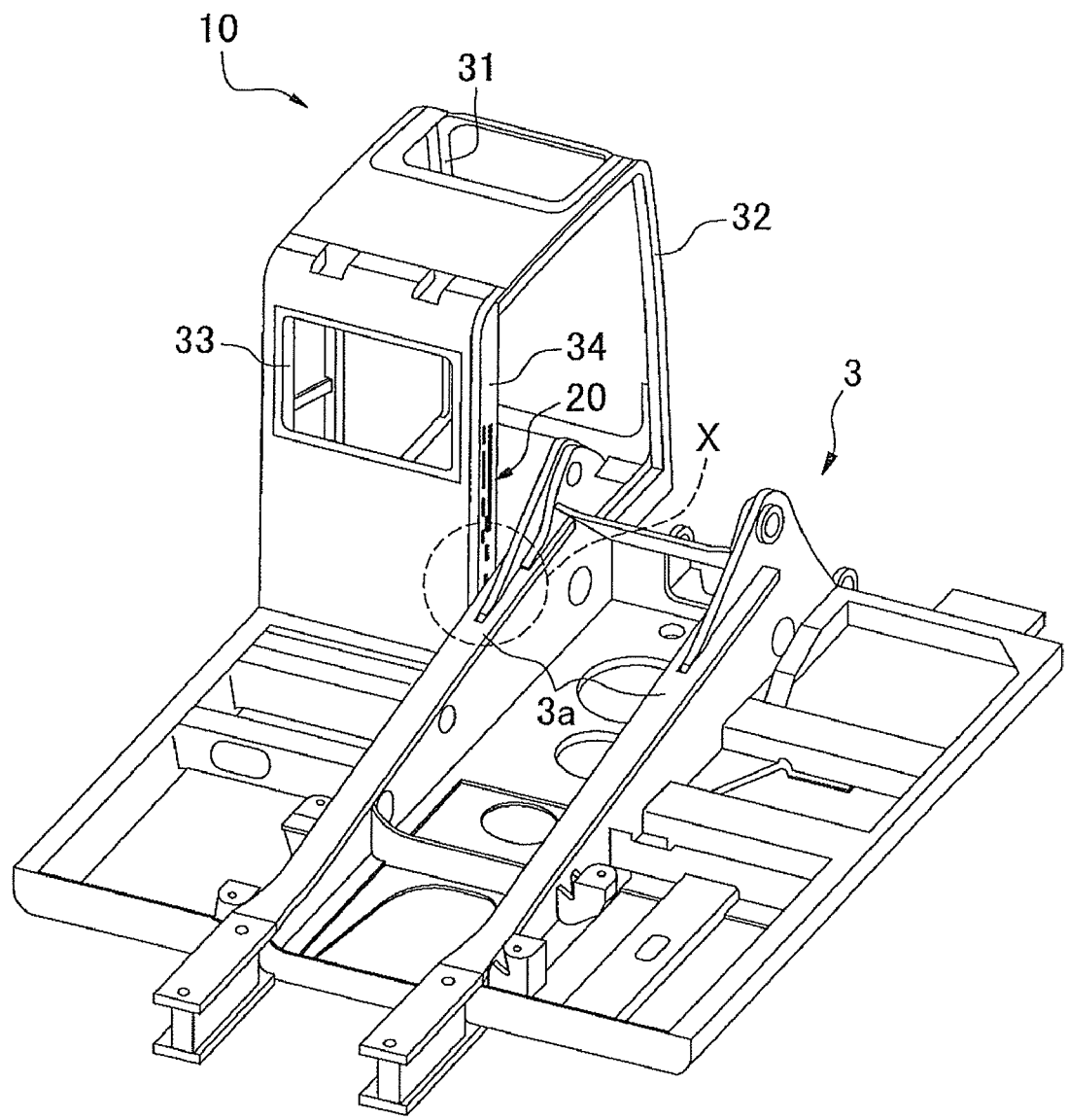
FIG. 2 is a perspective view showing a cab, which is installed on a revolving frame of the hydraulic excavator shown in FIG. 1.
Figure 3:
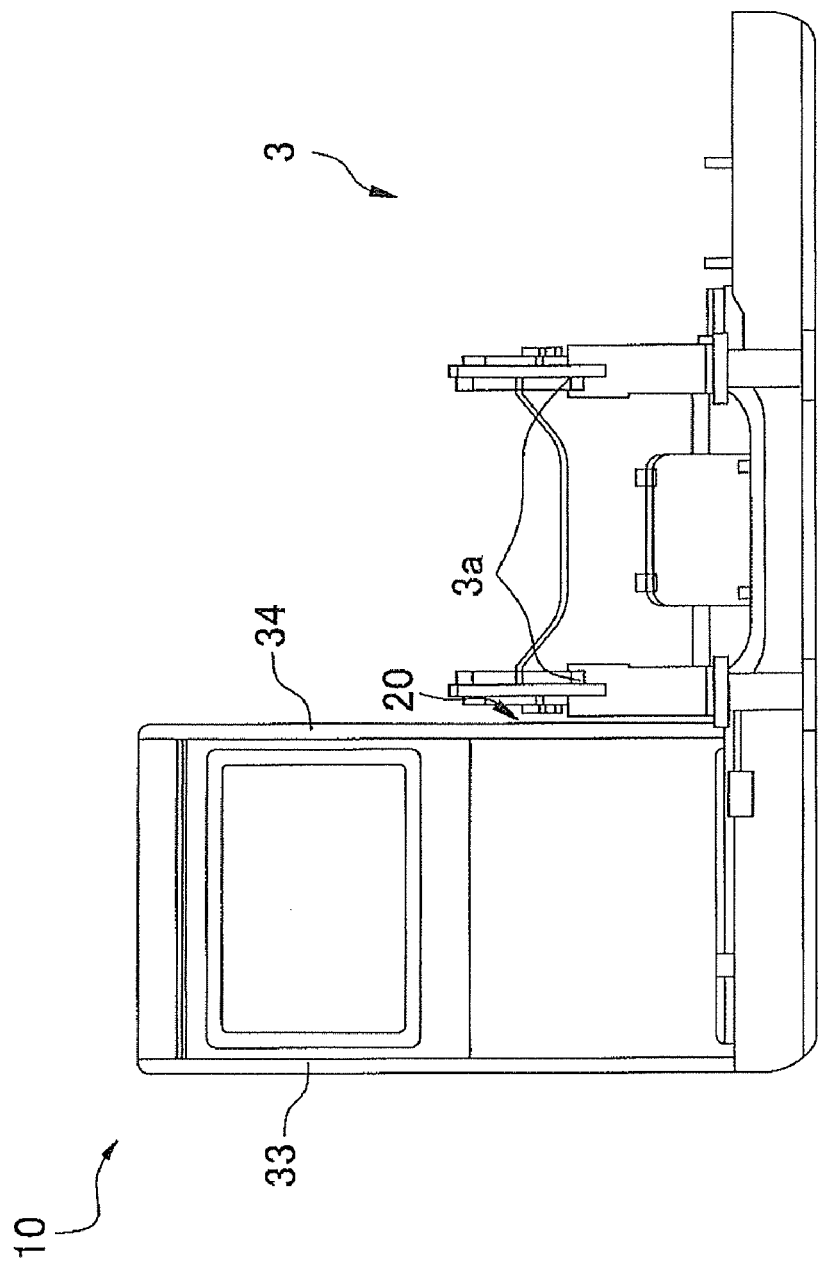
FIG. 3 is a rear view showing the cab on the revolving frame shown in FIG. 2.
Figure 4:
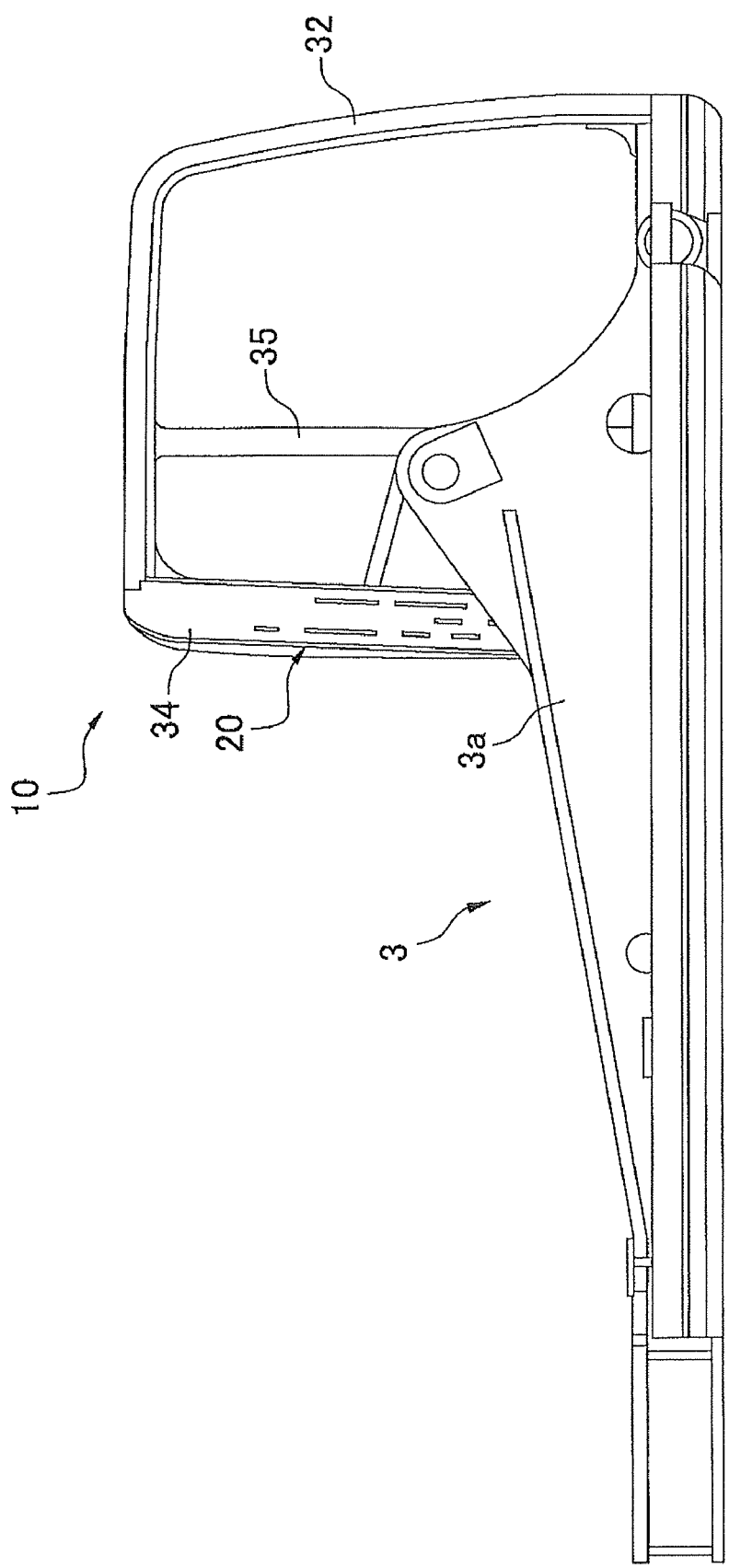
FIG. 4 is a side view showing the cab on the revolving frame shown in FIG. 2.

The cab 10 is an operator compartment of the hydraulic excavator 1 into/off which the operator steps, and is arranged on the left front side of the revolving frame 3 as the side of the working unit 4 mount portion to provide a clear sight line to the fore end of the working unit 4 for the operator (see FIGS. 2 to 4). The cab configuration of the cab 10 will be described later.

Configuration of Cab 10

Figure 5:
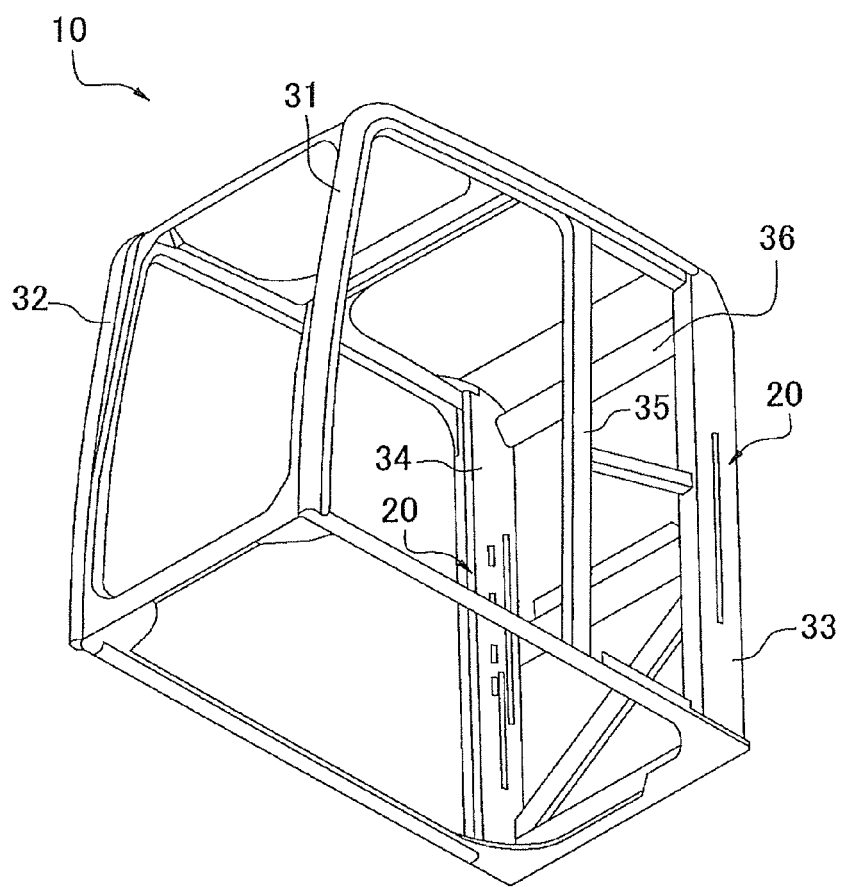
FIG. 5 is a perspective view showing the configuration of the cab shown in FIG. 2, etc.

As shown in FIGS. 2 to 4, the cab 10 is arranged near the left side of the main beam portion 3a on the revolving frame 3 that holds the working unit 4. Also, the cab 10 is composed of five pole members 31 to 35, a beam portion member 36, and the like, as shown in FIG. 5.

In the pole members 31 to 35, the left front pole member 31, the right front pole member 32, the left rear pole member 33, the right rear pole member 34, and the left central pole member 35 are provided.

The left front pole member 31 and the right front pole member 32 are used as so-called A pillar, and are pipes having internal spaces and prescribed shapes in cross-section. The left and right front pole members 31 and 32 are bent in a part near their center. Thus, each of left and right front pole members 31 and 32 includes a pole portion that stands from the front part of the cab 10, and a beam portion that composes the roof surface of the cab 10. The aforementioned pipe having an internal space and a prescribed shape in cross-section refers to a pipe that has a rectangular or a complicated shape in cross-section, for example, other than a round pipe.

The left rear pole member 33 and the right rear pole member 34 are used as so-called C pillar, and are rectangular pipes having internal spaces and prescribed shapes in cross-section. The left and right rear pole members 33 and 34 stand in a rear part from the floor of the cab 10 as substantially straight poles. Also, the upper ends of the left and right rear pole members 33 and 34 are joined to each other by the beam portion member 36. The left rear pole member 33 and the right rear pole member 34 play an important role in ensuring the strength of the cab 10. In particular, the right rear pole member 34 is spaced away from the main beam portion 3a of the revolving frames 3 in normal cases such as in operation, at idle and the like, however, in case of a rollover accident of the hydraulic excavator 1 or the like, deformation or inclination of the cab 10 may bring the right rear pole member 34 into contact with the main beam portion 3a of the revolving frame 3 near the right rear pole member 34. This contact may bend the right rear pole member 34 from the contact part. For this reason, the right rear pole member 34 preferably has a sufficient strength mainly in a part that may come in contact with the main beam portion 3a of the revolving frame 3.

Figure 6:
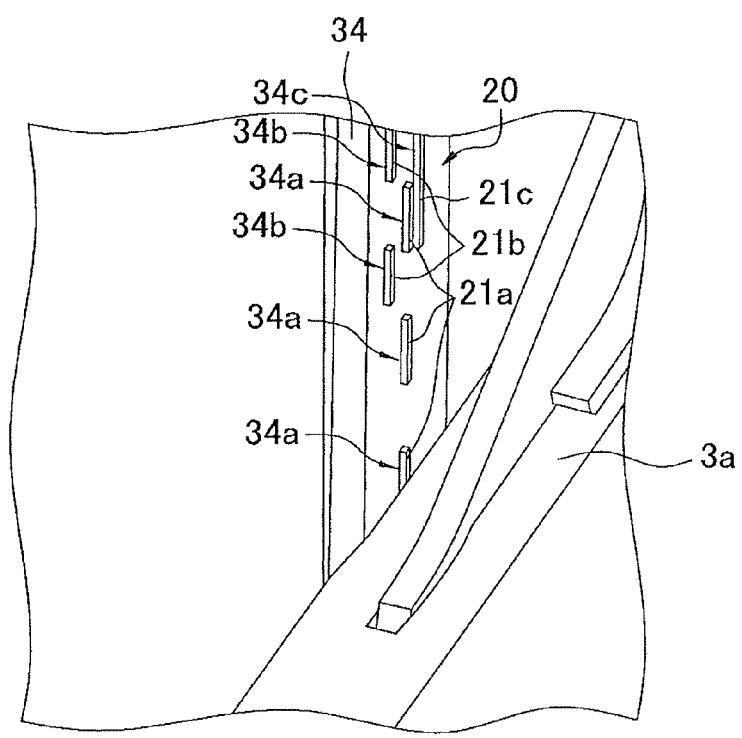
FIG. 6 is an enlarged view showing parts of the revolving frame and reinforcement structures arranged in a position near the cab shown in FIG. 2.
Figure 7:
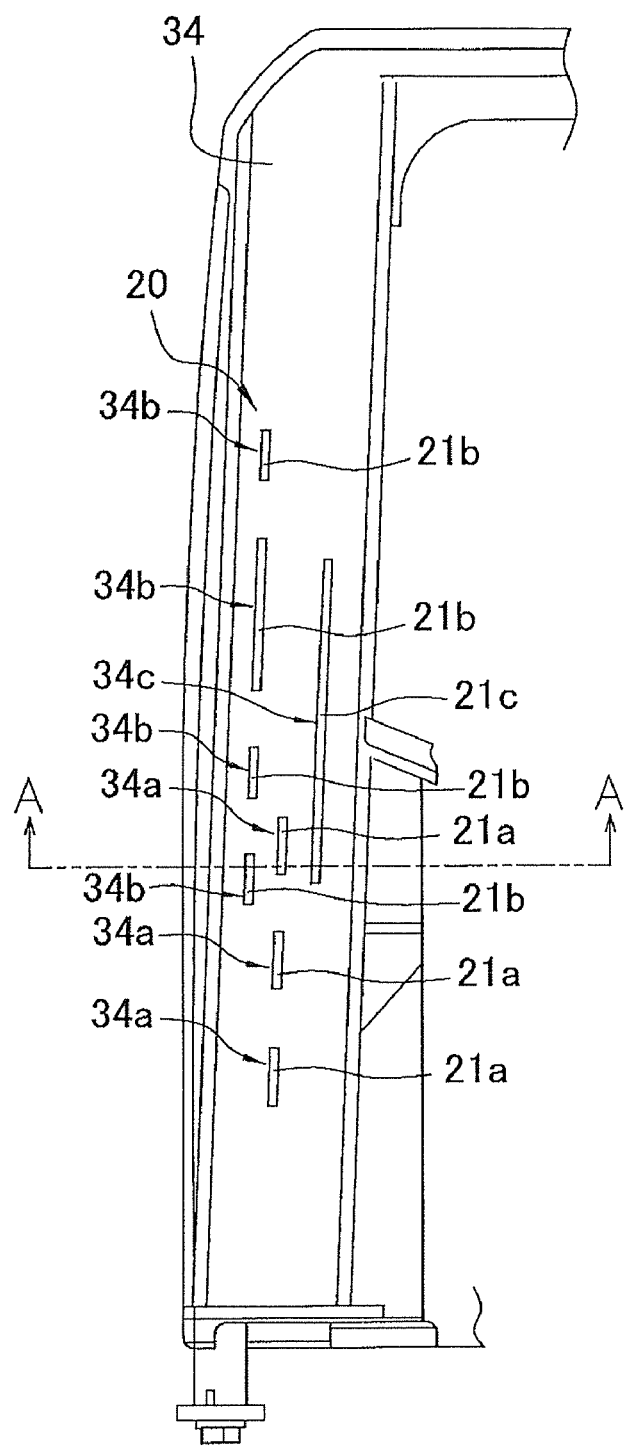
FIG. 7 is a side view showing the configuration of one pole member of pole members that compose the cab shown in FIG. 5.

In this embodiment, as shown in FIGS. 6, 7 and the like, hole portions 34a, 34b and 34c are formed on the side surfaces of the right rear pole member 34. Plate-shaped members 21a, 21b and 21c are inserted into and secured in the hole portions 34a, 34b and 34c, respectively, by welding. Thus, reinforcement structures 20 (reinforcement structures for pole member) are configured. The configuration of the reinforcement structures 20 will be described later.

The left center pole member 35 is used as so-called B pillar. The left center pole member 35 is a substantially straight pole that stands from the floor at the substantially center part on the left side surface of the cab 10.

Reinforcement Structure 20 for Left and Right Rear Pole Members 34

In this embodiment, as shown in FIGS. 6, 7 and the like, among the pole members 31 to 35 that compose the cab 10 installed on the aforementioned hydraulic excavator 1, the reinforcement structures 20 are formed in the right rear pole member 34 corresponding to a C pillar arranged in the rear part of the cab 10.

Since the left rear pole member 33 may not come in contact with other members such as the main frame of the revolving frame 3, it is enough that a similar reinforcement structure 20 is formed in a part near the center in the longitudinal direction of the left rear pole member 33 as shown in FIG. 5.

Figure 8:
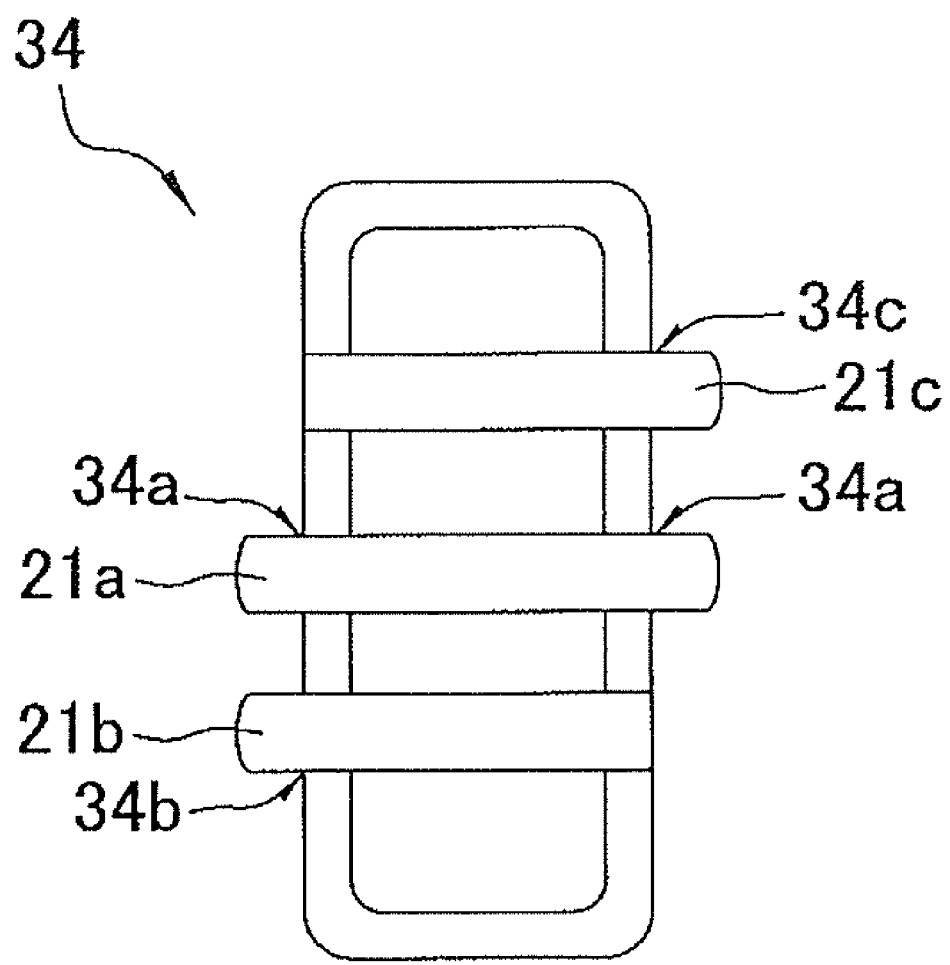
FIG. 8 is a cross-sectional view taken along a line A-A in FIG. 7.
Figure 9:
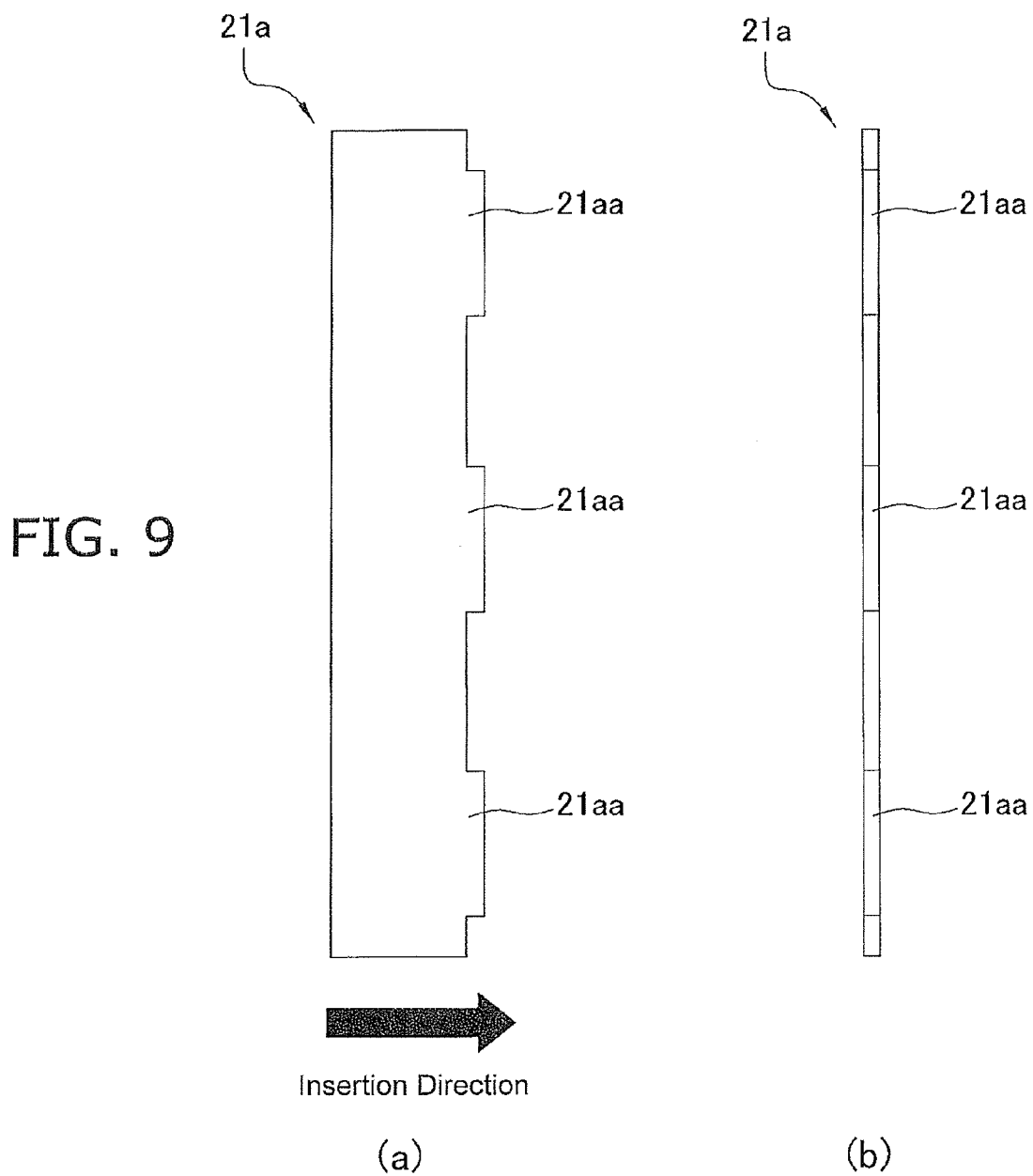
FIGS. 9(a) and 9(b) are a side view and a front view showing a plate-shaped member that composes the reinforcement structure.
Figure 12:
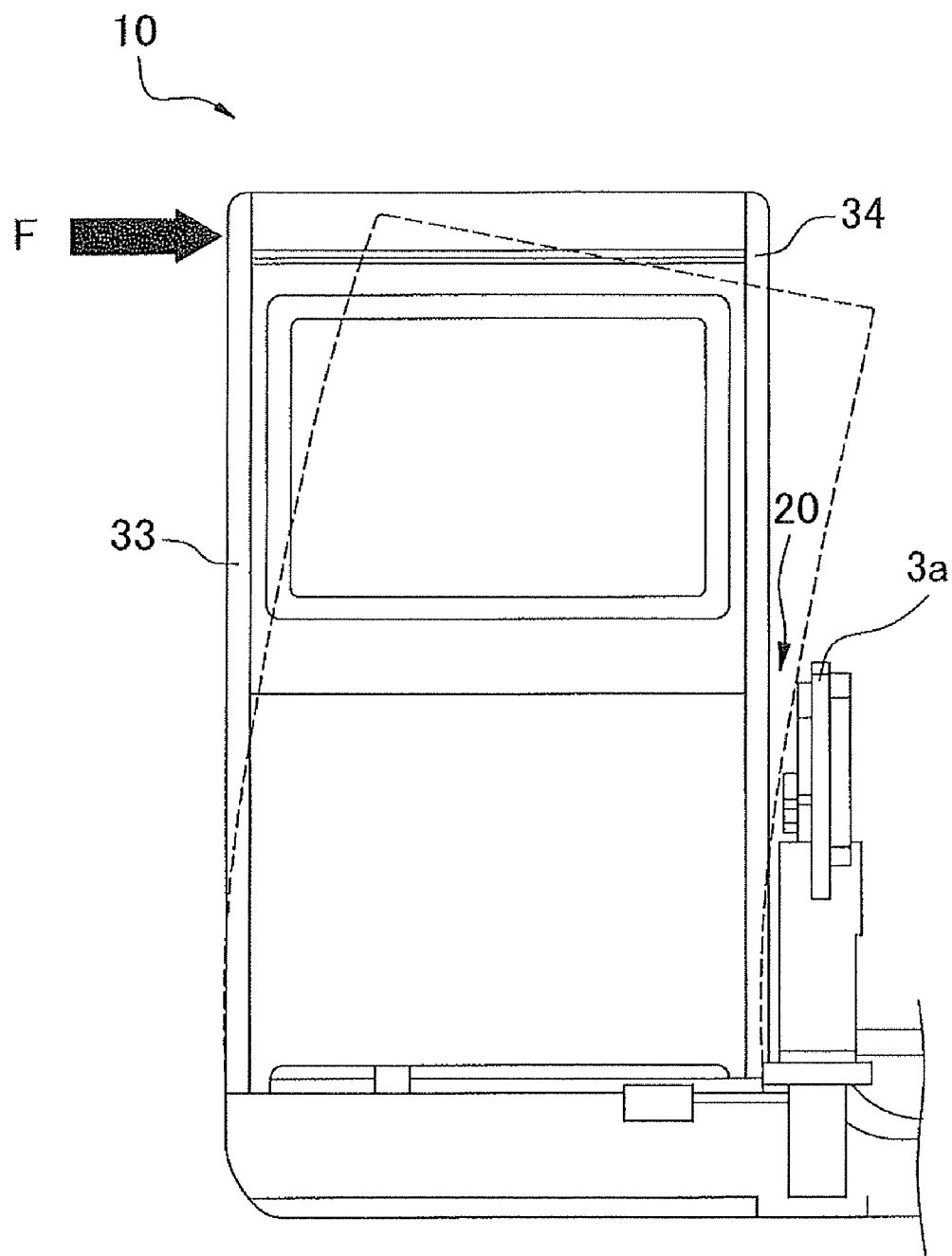
FIG. 12 is a front view showing the configuration near the reinforcement structures shown in FIG. 6.

As shown in FIGS. 6 and 12, the right rear pole member 34 has holes of a hole portion (first hole portion) 34a in a part near the main beam portion 3a of the revolving frame 3. The holes of the hole portion 34a penetrate two surfaces of the right rear pole member 34 that are opposed to each other. Also, as shown in FIGS. 7 and 8, the right rear pole member 34 has two sets of holes of hole portions (second hole portions) 34b and 34c in the substantially center portion in the longitudinal direction of the right rear pole member 34. The hole portions 34b and 34c are formed in parallel to each other to interpose the hole portion 34a in the width direction. Each of the hole portions 34b and 34c is composed of holes that penetrate the surfaces of the right rear pole member 34 that are opposed to each other. The plate-shaped member 21a or the like shown in FIGS. 9(a) and 9(b) is inserted into the holes of the hole portion 34a or the like, and is then secured from the exterior side by welding.

Thus, the reinforcement structure 20 is formed of the hole portion 34a and the plate-shaped member 21a inserted into the hole portion 34a. Similarly, the reinforcement structures 20 are formed of the hole portion 34b and the plate-shaped member (second plate-shaped member) 21a inserted into the hole portion 34b, and the hole portion 34c and the plate-shaped member (third plate-shaped member) 21c inserted into the hole portion 34c. The plate-shaped member 21b and 21c are inserted into the hole portions 34b and 34c in the opposite directions.

As shown in FIGS. 9(a) and 9(b), a plurality of protrusions 21 as are arranged on the insertion edge of the plate-shaped member 21a or the like correspondingly to the shape, interval and the like of the holes of the hole portions 34a or the like into which the plate-shaped member 21a or the like is inserted. Engagement of the protrusions 21 as on the insertion side with the holes of the hole portions 34a can easily position the plate-shaped member 21a. The same goes for the other plate-shaped members 21b and 21c to be inserted into the holes of the hole portions 34b and 34c.

Figure 10:
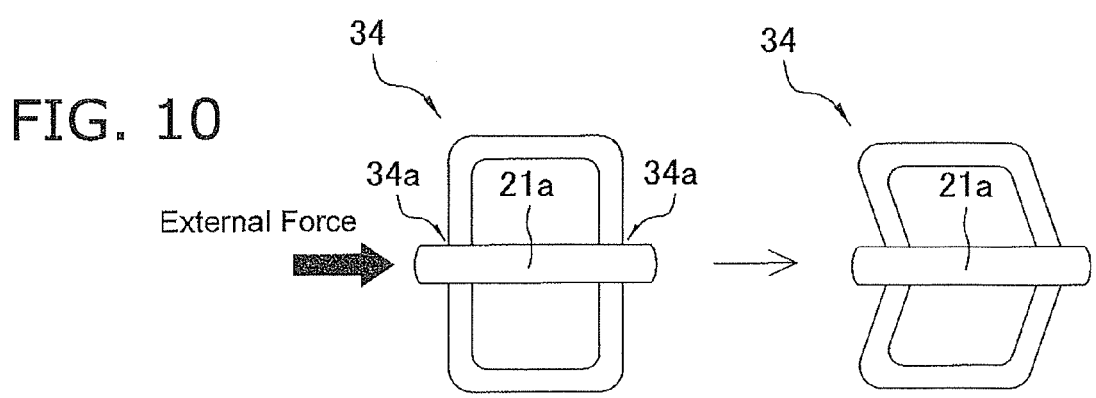
FIG. 10 is a cross-sectional view illustrating a deformation reduction state in that the plate-shaped member shown in FIG. 8 is inserted in a part near the center of the pole member.
Figure 13:
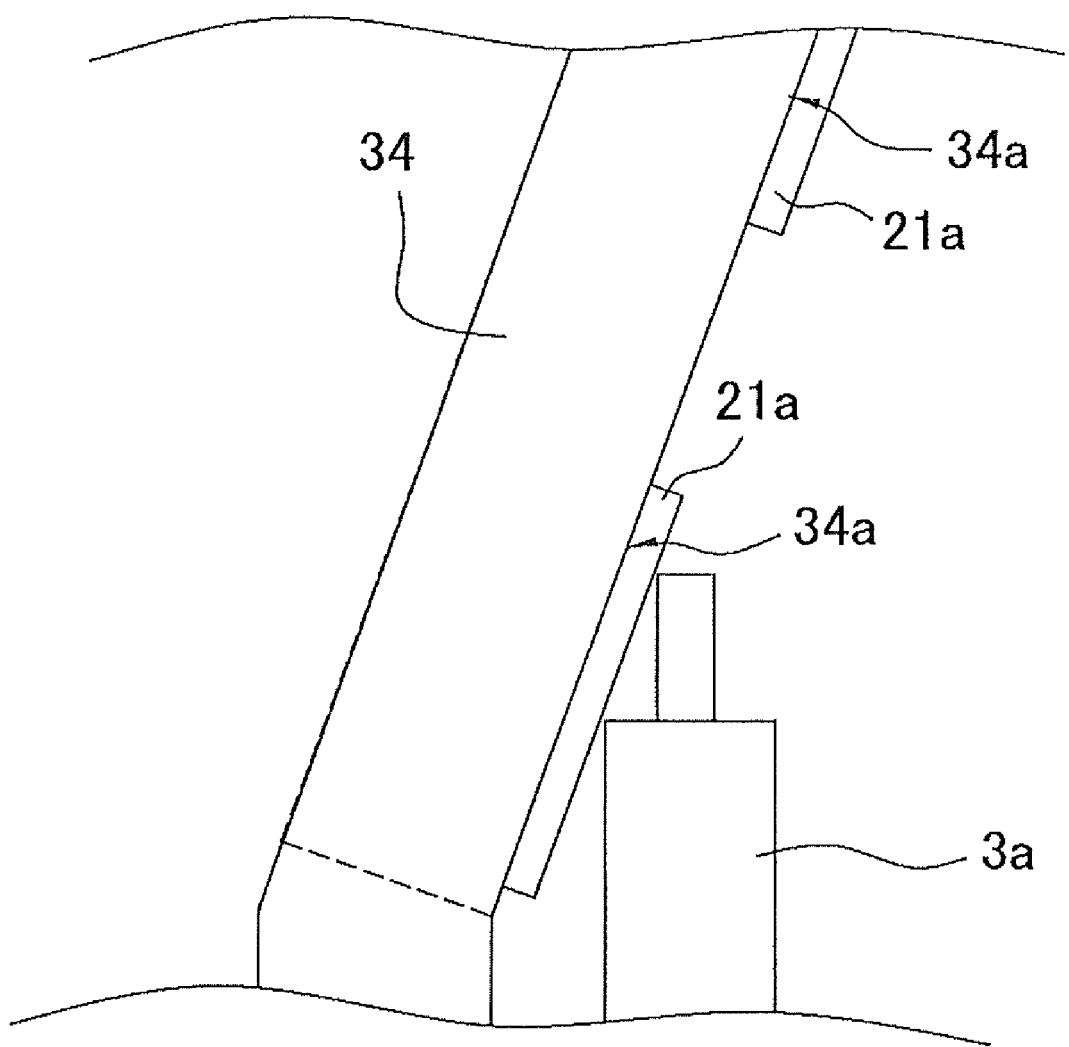

The plate-shaped member 21a is inserted in a direction that intersects the contact surface between the plate-shaped member 21a and the main beam portion 3a of the revolving frame 3 near the plate-shaped member 21a. As shown in FIG. 13, in case of a rollover accident of the hydraulic excavator 1 or the like, even if deformation, inclination or the like occurs in the cab 10 so that the lower part of the right rear pole member 34 comes in contact with the main frame of the revolving frame 3, the plate-shaped member 21a bears an external force applied to the right rear pole member 34 from the insertion direction. As a result, it is possible to improve the sectional strength of the right rear pole member 34. Note that, in actual hydraulic excavators, in order to enhance their appearance, panels are attached on the pole members to cover the pole members. In the case where the plate-shaped member 21a contacts the pole member via the panel, it is expected that similar effects is provided. As shown in FIG. 8, the plate-shaped member 21a passes a part close to the substantially center portion of the right rear pole member 34 in cross-section, and is inserted into and secured in the holes. Accordingly, as shown in FIG. 10, even if an external force is applied in the insertion direction of the plate-shaped member 21a, it is possible to suppress the deformation amount of the right rear pole member 34.

Figure 11:
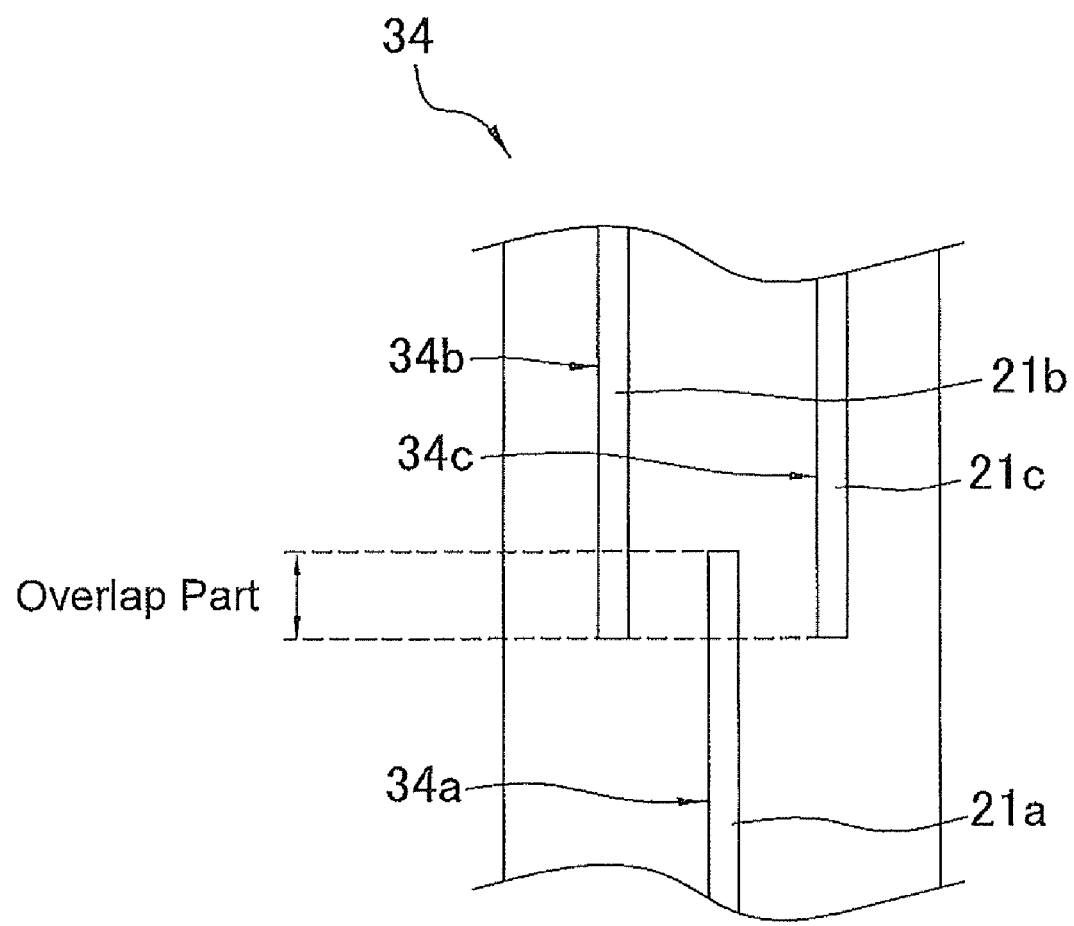
FIG. 11 is an enlarged view showing an overlap part between the reinforcement structures shown in FIG. 6.

As shown in FIG. 11, the plate-shaped member 21a and the hole portion 34a, and the plate-shaped members 21b and 21c and the hole portions 34b and 34c included in the reinforcement structures 20 partially overlap each other in the longitudinal direction of the right rear pole member 34 in the front view. Accordingly, it is possible to avoid the absence of the reinforcement structure 20 near the longitudinal center of the right rear pole member 34, and the lower reinforcement structure 20. As a result, it is possible to avoid that a strength reduction part locally appears. Therefore, the right rear pole member 34 has an excellent strength.

As shown in FIG. 7, etc, as for the holes of the hole portions 34a to 34c that are formed on peripheral surfaces of the right rear pole member 34, the holes are spaced away from each other in the longitudinal direction at a longer interval as far as possible. Accordingly, it is possible to avoid increase of the number of holes that are aligned with each other in the width direction of the right rear pole member 34 in one surface that composes the section of the right rear pole member 34. As a result, it is possible to prevent assembling accuracy reduction by deformation due to the increase of the number of holes that are aligned with each other in one surface of the right rear pole member 34. Therefore, it is possible to provide accurate welding, assembling and the like.

Features of Cab 10 Including Reinforcement Structures 20 for Right Rear Pole Member 34

(1) In the cab 10 according to this embodiment, in the arrangement where the right rear pole member 34 composing the cab 10 arranged on the revolving frame 3 is arranged in proximity to the main beam portion 3a of the revolving frame 3 as shown in FIG. 2, etc., the reinforcement structure 20 composed of the combined hole portion 34a and plate-shaped member 21a is formed in the aforementioned proximity part of the right rear pole member 34 as shown in FIG. 6, etc. Specifically, the plate-shaped member 21a is inserted into and secured in the hole portion 34a that penetrates the wall surfaces of the pipe-shaped right rear pole member 34 so that the reinforcement structure 20 is configured.

Accordingly, in case of a rollover accident of the hydraulic excavator 1 or the like, even if a large external force is laterally applied to the cab 10 and the cab 10 is deformed so that the right rear pole member 34 and the main beam portion 3a in proximity to each other comes in contact with each other, it is possible to avoid that the right rear pole member 34 is bent from the contact part. For this reason, since the reinforcement structure is selectively arranged in a part in the right rear pole member 34 that may locally receive a load, the simple structure can improve the strength of the pipe-shaped, lightweight right rear pole member 34, and as a result can effectively improve the stiffness of the cab 10.

(2) In the cab 10 according to this embodiment, as shown in FIGS. 8 and 10, among the plate-shaped member 21a to 21c inserted into the hole portions 34a to 34c of the right rear pole member 34, as for the plate-shaped member 21a that is inserted into the hole portion 34a that is arranged in proximity to the main beam portion 3a of the revolving frame 3, the plate-shaped member 21a passes the substantially center portion in cross-section, and is inserted into and secured in the hole portion 34a.

Accordingly, it is possible to most effectively reinforce the sectional strength of the right rear pole member 34, and to stably improve the strength of the right rear pole member 34.

(3) In the cab 10 according to this embodiment, as shown in FIGS. 6 and 8, the plate-shaped member is inserted in a direction that intersects the contact surface between the plate-shaped member and the main beam portion 3a of the revolving frame 3 near the plate-shaped member 10. In other words, the plate-shaped member 21a is inserted in a direction where the plate-shaped member 21a comes in contact with the main beam portion 3a of the revolving frame 3.

Accordingly, even if deformation or the like of the cab 10 brings the right rear pole member 34 into contact with the main beam portion 3a of the revolving frame 3, the plate-shaped member 21a that is inserted and secured in the contact direction can bear the right rear pole member 34 so that the right rear pole member 34 does not collapse. Accordingly, since, for a part that is expected that an external force is applied from a particular direction, the insertion direction of the plate-shaped member 21a is specified in accordance with a direction of the external force, it is possible to most effectively reinforce the right rear pole member 34.

(4) In the cab 10 according to this embodiment, as shown in FIGS. 7 and 8, in addition to the reinforcement structure 20 formed in a part in proximity to the revolving frame 3, the reinforcement structures 20 are formed that are composed the hole portions 34b and 34c, and the plate-shaped member 21b and 21c. The hole portions 34b and 34c are arranged in parts in proximity to the substantially center portion in the longitudinal direction of the right rear pole member 34.

Accordingly, since the reinforcement structures 20 are formed also in parts of the right rear pole member 34 that most greatly receive a load when an external force is applied from the upper part of the cab 10 (substantially center portion in the longitudinal direction), for example, it is possible to further improve the strength of the right rear pole member 34. As a result, it is possible to further improve the stiffness of the entire cab 10.

(5) In the cab 10 according to this embodiment, as shown in FIGS. 7 and 11, as for the hole portion 34a, and the hole portions 34b and 34c that are formed on the same surface of the right rear pole member 34, the hole portion 34a, and the hole portions 34b and 34c are arranged in substantially parallel to each other, and ends of the hole portion 34a, and the hole portions 34b and 34c partially overlap each other.

Accordingly, in the case where a plurality of reinforcement structures 20 are arranged in the longitudinal direction in the right rear pole member 34, it is possible to avoid that a poor strength part locally appears. Such a poor strength part may be a part between the reinforcement structures 20, and the like. As a result, it is possible to stably longitudinally reinforce the right rear pole member 34.

(6) In the cab 10 according to this embodiment, as shown in FIGS. 7, 11 and the like, the reinforcement structure 20 (hole portion 34a and plate-shaped member 21a) in proximity to a part of the revolving frame 3 is arranged between the reinforcement structures 20 (two hole portions 34b and 34c, and plate-shaped members 21b and 21c) in parts in proximity to the substantially center portion of the right rear pole member 34.

Accordingly, it is possible to provide the reinforcement structures 20 that include the combined three plate-shaped members 21a to 21c and thus bear an external force expected to be applied to the right rear pole member 34.

(7) The cab 10 of the hydraulic excavator 1 according to this embodiment includes the right rear pole member 34 including the aforementioned reinforcement structures 20, as shown in FIGS. 1 and 2.

Accordingly, as stated above, it is possible to reduce the weight of the cab 10 by using the pipe-shaped pole members 31 to 34, and additionally to improve the stiffness of the entire cab 10 by effectively reinforcing a part that may locally receive an external force.

Other Embodiments

The above description has described an exemplary embodiment according to the present invention. However, the present invention is not limited to the foregoing embodiment. Various changes and modifications can be made without departing from the spirit of the present invention.

(A) In the foregoing embodiment, the reinforcement structure 20 according to the present invention has been illustratively described that is adopted only to the right rear pole member 34 that composes the cab 10. However, the present invention is not limited to this.

For example, the reinforcement structure according to the present invention can be adopted to any pole members that are arranged in proximity to another member such as a part of the revolving frame. Alternatively, the reinforcement structure according to the present invention can be adopted to a particular pole member other than the right rear pole member.

(B) In the foregoing embodiment, the main beam portion 3a that holds the working unit 4 has been illustratively described as a part of the revolving frame 3 that is arranged in proximity to the right rear pole member 34 to which the reinforcement structure 20 according to the present invention is adopted. However, the present invention is not limited to this.

For example, another part other than the protruding part of the mount portion for the working unit may be a part of the pole member to be arranged in proximity to the particular pole member.

(C) In the foregoing embodiment, three hole portions 34a to 34c in the right rear pole member 34 has been described that accommodate the plate-shaped members 21a to 21c, respectively, to form the reinforcement structures 20. However, the present invention is not limited to this.

For example, only one hole portion may be formed in the particular pole member to accommodate one plate-shaped member.

Alternatively, three or more hole portions may be formed in the particular pole member so that each of the hole portions accommodates one plate-shaped member.

(D) In the foregoing embodiment, as for the plate-shaped member 21b and 21c to be inserted into the hole portions 34b and 34c that are formed in proximity to the center in longitudinal direction of the right rear pole member 34, it have been illustratively described that the insertion directions of the plate-shaped members 21b and 21c are opposite to each other. However, the present invention is not limited to this.

For example, the insertion directions of all the plate-shaped members may be the same.

However, in the case where external forces are applied to the cab not only in one certain direction, the reinforcement structures preferably include the plate-shaped members that are inserted in different directions.

(E) In the foregoing embodiment, the hydraulic excavator 1 has been illustratively described as a construction machine that includes the cab 10 composed of the pole members including the reinforcement structure 20 for the pole member according to the present invention. However, the present invention is not limited to this.

For example, the reinforcement structure according to the present invention can be adopted to a pole member that composes a cab installed on another type of construction machine such as a wheel loader.

A reinforcement structure for a pole member according to the illustrated embodiment has effects in that a minimal additional structure for the pipe-shaped pole member can avoid the pole member from being bent at a contact part, and in that the weight of a cab can be reduced but the stiffness of the cab can be improved. For this reason, the reinforcement structure can be widely applied to pole members that compose cabs of construction machines.

The invention claimed is:

1. A cab comprising:
left and right rear pole members having internal spaces,
the right rear pole member including a pair of opposing surfaces aligned in the left-and-right direction of the cab, and including
a first hole portion that extends along the longitudinal direction of the right rear pole member, the first hole portion being formed in the opposing surfaces to penetrate the right rear pole member in the left-and-right direction of the cab, and
a first plate-shaped member inserted into and secured in the first hole portion so that the first plate-shaped member extends between the opposing surfaces generally along the left-and-right direction of the cab.

2. The cab according to claim 1, wherein
the first plate-shaped member is inserted into the first hole portion so that the first plate-shaped member extends in a substantially center portion of the right rear pole member in cross-section.

3. The cab according to claim 1, wherein
the right rear pole member further includes
a second hole portion that is formed in proximity to a substantially center portion in the longitudinal direction of the right rear pole member, and
a second plate-shaped member inserted into and secured in the second hole portion.

4. The cab according to claim 3, wherein
the first hole portion is spaced apart from the second hole portion in the width direction of the pole member, and partially overlaps the second hole portion in the longitudinal direction of the right rear pole member.

5. The cab according to claim 3, further comprising
an additional second hole portion arranged in parallel to and adjacent to the second hole portion in the width direction of the right rear pole member, and the first hole portion is arranged between the second hole portion and the additional second hole portion in the width direction.

6. A construction machine comprising:
a cab that is installed on a revolving frame, the cab including a plurality of pole members having internal spaces; and
a main beam portion that is arranged on the revolving frame,
one of the pole members that is arranged in proximity to the main beam portion including a pair of opposing surfaces aligned in the left-and-right direction of the cab, and including
a first hole portion that is formed in the opposing surfaces at a position near the main beam portion, the first hole portion extending along the longitudinal direction of the pole member and penetrating the pole member in the left-and-right direction of the pole member, and
a first plate-shaped member inserted into and secured in the first hole portion so that the first plate-shaped member extends between the opposing surfaces generally along the left-and-right direction of the cab.

7. A construction machine comprising:
a cab that is installed on a revolving frame, the cab including a plurality of pole members having internal spaces; and
a main beam portion that is arranged on the revolving frame,
one of the pole members that is arranged in proximity to the main beam portion including a pair of opposing surfaces aligned in the left-and-right direction of the cab, and including
a first hole portion that is formed in the opposing surfaces at a position near the main beam portion, the first hole portion extending along the longitudinal direction of the pole member and penetrating the pole member in the left-and-right direction of the pole member, and
a first plate-shaped member inserted into and secured in the first hole portion, the first hole portion and the first plate-shaped member being arranged in a position that is spaced away from the main beam portion in the normal state and coming in contact with the main beam portion when the pole member is inclined by a load that is applied to the cab toward the main beam portion so that the first plate-shaped member extends between the opposing surfaces generally along the left-and-right direction of the cab.

* * * * *